United States Patent [19]

D'Arcangeli

[11] 3,940,220

[45] Feb. 24, 1976

[54] METHOD AND EQUIPMENT FOR THE MANUFACTURE OF VARIEGATED DETERGENT BARS

[75] Inventor: Alessandro D'Arcangeli, Castelgandolfo, Italy

[73] Assignee: Colgate-Palmolive Company, New York, N.Y.

[22] Filed: Jan. 7, 1974

[21] Appl. No.: 431,112

Related U.S. Application Data

[63] Continuation of Ser. No. 206,412, Dec. 9, 1971, abandoned.

[30] Foreign Application Priority Data

Dec. 29, 1970  Italy .................................. 55693/70

[52] U.S. Cl. ............... 425/131.1; 252/90; 252/367; 264/75; 264/102; 264/148; 425/199; 425/376
[51] Int. Cl.² ......................................... B29F 3/12
[58] Field of Search ... 264/75, 73, 211, 349, 176 R, 264/150, 148, 102; 252/90, 367, 121, 131; 425/130, 131, 131.1, 376, 199

[56] References Cited
UNITED STATES PATENTS

| | | | |
|---|---|---|---|
| 2,257,067 | 9/1941 | Parsons ........................... | 264/176 R |
| 2,332,829 | 10/1943 | Parsons et al. ...................... | 264/75 |
| 3,026,594 | 3/1962 | Gajda et al. ........................ | 264/148 |
| 3,485,905 | 12/1969 | Compa et al. ........................ | 264/75 |
| 3,663,671 | 5/1972 | Meye et al. ......................... | 264/211 |
| 3,673,294 | 6/1972 | Mattaei .............................. | 264/75 |

FOREIGN PATENTS OR APPLICATIONS

| | | |
|---|---|---|
| 584,141 | 2/1958 | Italy |
| 1,191,721 | 5/1970 | United Kingdom ...................... 25/8 |

Primary Examiner—Jeffery R. Thurlow
Attorney, Agent, or Firm—K. A. Koch, Esq.; H. S. Sylvester, Esq.; M. M. Grill, Esq.

[57] ABSTRACT

Variegated detergent bars are made by mixing together pieces of soaps of contrasting colors in a vacuum zone and plodding the mixture in such manner as to fuse the different soaps together but maintain colors separate, thereby producing a desired pattern therein, preferably resembling marble. The pattern is controllable by variations of the proportions of material charged, plasticities thereof, speeds of the worms, design of the compression-extrusion head and preferably, by extruding the soaps through small openings in a plate after the final plodder worm, cutting the extrudates and imparting transverse or radial motions to them before final extrusion.

Also described are plodding and extruding apparatuses utilized to practice the variegating process.

1 Claim, 11 Drawing Figures

3,940,220

METHOD AND EQUIPMENT FOR THE MANUFACTURE OF VARIEGATED DETERGENT BARS

This is continuation of application Ser No. 206,412, filed Dec. 9, 1971, now abandoned.

SUBJECT OF THE INVENTION

This invention relates to processes and apparatuses for producing variegated detergent bars and tablets. More particularly, it is of methods and apparatuses wherein differently colored detergent compositions, preferably soaps of contrasting colors, are blended together in a vacuum zone of a plodder, before a plodder worm, and are extruded in the form of a variegated bar, which may be subsequently cut to lengths and pressed into cake or tablet form.

BACKGROUND OF THE INVENTION

Variegated, striped, marblized or mottled soap bars have been known for many years. Initially, as laundry soaps, they contained coloring materials, such as bluing agents, which functioned as aids for the whitening of clothing and textiles washed with the soaps. In recent years, however, interest in such bars has been primarily due to the possibility of producing attractive designs therein, which would be preferred by consumers. Thus, a marble pattern on a soap gives it a rich appearance and stripes or other similar configurations make the soap distinctive.

The manufacture of attractive variegated detergent bars is more difficult than the production of white soaps or these of a single color. To make the variegated products, it is important to mix the coloring agents with the soap to the correct degree. Too much mixing results in a completely colored product and too little mixing can produce an unatractive detergent bar. Furthermore, the nature of the blending of the coloring agent with the base detergent is relevant to the final design. Finally, although it is important to maintain the differently colored parts of the soap separate and distinct in appearance, they must be satisfactorily fused together so that they do not prematurely come apart in use and do not crack, become rough or pebbly at interfaces or dissolve at different rates.

Prior art methods of making variegated soap bars include: blendings of differently colored liquid soaps; pressing into cake form of soap powders; adding dyes or pigments to the vacuum chamber of a plodder; and blending together differently colored soaps, in solid form, and compacting them to bar or cake form. Many of these methods have met with a measure of success but the method of the present invention is particularly useful because it is readily adaptable to available equipment, is easily controlled and results in the production of a delicately marbled detergent bar or tablet.

DESCRIPTION OF THE INVENTION

In accordance with the present invention a method of manufacturing a variegated detergent bar comprises plodding a first solid, plastic detergent composition in a vacuum plodder, adding to pieces of such detergent composition in a vacuum zone, before the final worm of the plodder, pieces of a second solid, plastic detergent composition of a contrasting color, plodding the mixture of detergent compositions and extruding it as a variegated detergent bar. Preferred embodiments of the process are those wherein a variegated soap bar or tablet is being made, high vacuum is employed in the vacuum zone, the proportion of one of these soaps is 3 or 5 to 25% of the total final bar, the plodder worm under the vacuum chamber is covered with soap filaments or rods to the extent of 30 to 70% of the height thereof, the soap present in minor quantity is more plastic than the major soap, a short compression-extrusion section is employed after the final plodder worm and shortly before extrusion, the mixed soaps are passed through plates with small openings therein and are given a transverse or radial movement to improve the marblized pattern.

Also described are apparatuses for effecting the process, comprising principally a plurality of plodders, at least one of which includes a vacuum chamber before the final worm, means for controlling the rates of feed to the final worm and means for extruding the mixed product through a short head after it has been extruded as filaments or pellets, cut and given a transverse or radial motion.

Various objects, details, constructions, operations, uses and advantages of the present invention, in its various aspects, will be apparent from the following description, taken in conjunction with the accompanying drawing of apparatus embodiments of the invention and the product made, in which drawing:

THE DRAWING

DETAILED DESCRIPTION OF THE INVENTION

Figure 1:
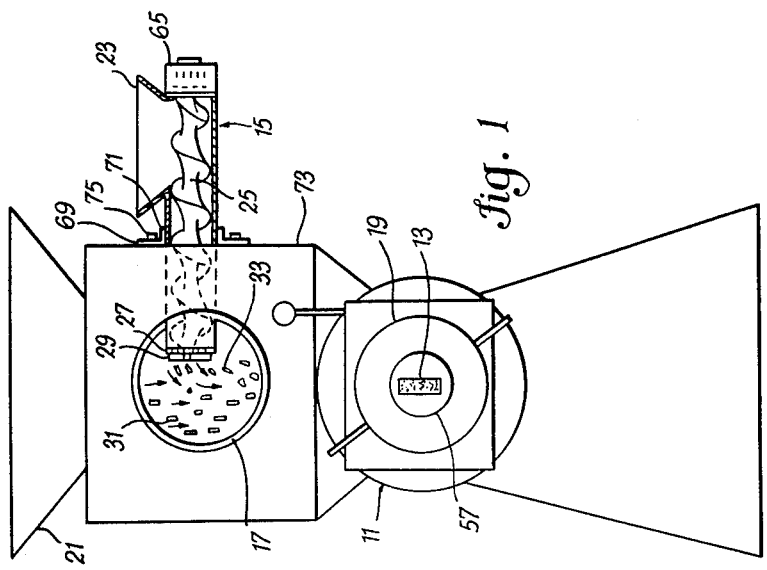
FIG. 1 is a partially vertically sectioned front elevational schematic view of an embodiment of apparatus of the present invention.

In FIG. 1, numeral 11 designates a primary plodder, from which a variegated soap bar 13 is extruded through a nozzle plate. As shown, primary plodder 11 is greater in size and capacity than auxiliary plodder 15 and for the purpose of discussion herein it will be considered that the feed to the primary plodder 11 is a base soap of one color, preferably white, and that to the auxiliary or secondary plodder 15 is a soap which constitutes a minor proportion of the final product and is of contrasting appearance to the base soap, preferably a colored soap and most preferably, a strongly colored soap.

Figure 2:
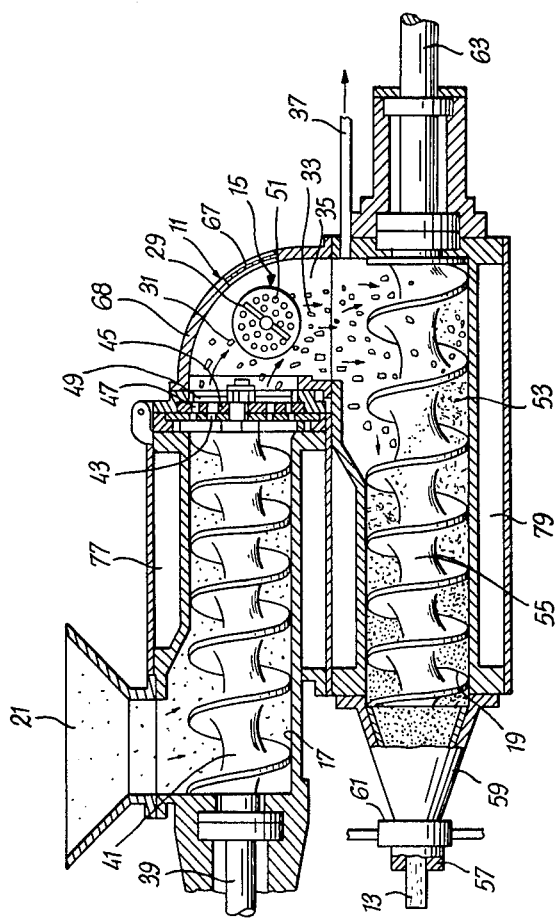
FIG. 2 is a central longitudinal vertical elevation of the apparatus of FIG. 1.
Figure 3:
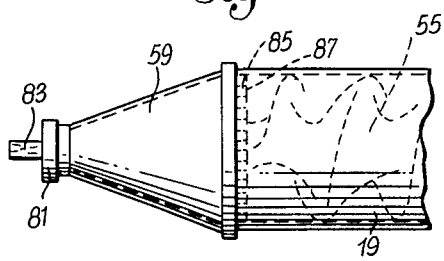
FIG. 3 is a central longitudinal vertical elevation of a part of the lower worm portion of the final plodding apparatus, similar to that illustrated in FIG. 2 but with a perforated pressure plate between the final plodder worm and the plodder nose or compacting head.
Figure 4:
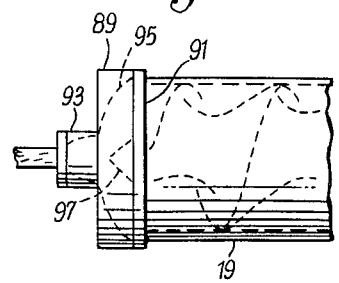
FIG. 4 is a view similar to that of FIG. 3 but with the more highly tapered plodder nose of FIG. 3 replaced with a shorter compacting head, for better control of the variegating of detergent composition plodded.

As illustrated, the primary plodder comprises a plurality of barrels 17 and 19, in each of which there is present a plodding worm, better illustrated in FIGS. 2–4. Soap chips, ribbons, filaments, rods or powders are added to plodder 11 through hopper 21 (it is preferred to use milled soap chips or ribbons as the charge), pass through the upper worm, are extruded into a vacuum chamber, wherein they are mixed with colored soap rods or filaments from the auxiliary plodder and then, the mixture is plodded through the lower worm of the two-worm plodder to form billet or bar 13, which may be cut to length and pressed into cake or tablet form on a conventional soap press, either with or without preliminary scraping away of the bar surface to reveal more attractive marblized or variegated patterns. The auxiliary plodder, illustrated as a comparatively small single worm plodder 15, comprises hopper 23, worm 25, perforated pressure plate 27 and cutting knife 29. As shown, rods 31 of white soap, extruded from the primary plodder are blended with rods 33 of colored soap, produced by the auxiliary plodder, and are dropped to the lower and final compacting worm in barrel 19 for extrusion to final variegated billet form.

In FIG. 2 the relationship of the two plodders is better illustrated. In this figure vacuum chamber 35, between upper and lower worms of plodder 11, is held under vacuum by communication with vacuum line 37. Into the vacuum chamber, white soap is forced by drive means, not illustrated, shaft 29 and worm 41, through screen 43 and pressure plate 45, containing openings 47, and is extruded in rod form after being cut by knife 49. White soap rods 31 are blended with colored soap rods 33, which are forced by auxiliary plodder 15 through perforations 51 in plate 27 and are cut to lengths by knife 29. Subsequently, the rods or filaments extruded and cut form a bed 53 about worm 55 in plodder barrel 19. The depth of the bed is regulated by the feed rates from worm 41 and auxiliary plodder 15, in conjunction with the extrusion rate through plodder nozzle 57, held to plodder nose or cone 59 by threaded fastening means 61. The delivery and take-off rates for the soaps are controlled in part by the worm sizes, pitches and depths thereof but the major means of control is variation of the speeds at which the worms are driven. Variable speed drives for drive shafts 39 and 63 of the primary plodder are not illustrated but are employed, and variable speed motor 65 is used to modify the delivery of colored soap from the auxiliary plodder. The correct depth of bed of soap at 53 is regulatable by controlling speeds of the drive motors and such control is effected when the depth is either too great or too small, as viewed through a transparent window 67 in wall 69 of the primary plodder.

The secondary plodder is held firmly in position against the primary plodder by pressure-tight gasketed flange 69 which is fastened to the auxiliary plodder at 71 and is held to wall 73 of the first plodder by bolts 75.

To secure the correct plodding temperatures, the plodders are water jacketed and the temperatures of the water in the jackets are controllable. A water jacket is not illustrated for the auxiliary plodder nor is a vacuum chamber shown thereon but it is to be understood that such may also be employed there and preferably are utilized. Water jackets 77 and 79 serve to heat or cool the soap in the primary plodder, as may be desired. In the plodding of ordinary milled and plodded toilet soaps, it will usually be necessary to employ cooling water in the jackets to prevent the temperature of the soap from becoming too high, due to the heat which is generated by the friction of working the soap in the plodder barrels. Although cooling water or other heat transfer fluid will often be employed in the present processes, in some cases the medium in the jacket may be used to heat the detergent composition being plodded so as to render it more plastic, and to promote bonding together of the differently colored soaps.

In FIG. 3 there is represented the lower barrel 19 of the first plodder and worm 55 therein. The soap contained in the worm is forced through plodder nose 59 and nozzle 81 to produce variegated billet 83. To modify the design of the plodder bar extruded, and to make it somewhat streakier with a greater blending of the colored and uncolored soaps, a perforated pressure plate 85 is utilized, through the perforations 87 of which, rods or filaments of soaps are extruded into the plodder nose or compression zone. A different design of the compression and extrusion zone is illustrated in FIG. 4, wherein there is fastened to plodder barrel 19 a comparatively short plodder nose or chamber 89 after perforated pressure plate 91. It will be seen that the length of such nose, including the extrusion head portion thereof 93, is less than half of the diameter of the worm. The boundaries determining the path followed by most of the soap being extruded are shown by dotted lines 95 and 97.

Figure 5:
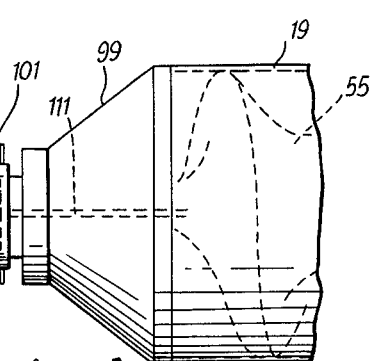
FIG. 5 is a central longitudinal vertical section of the final plodder barrel, worm and nose, with an additional variegating head thereon, to modify the marblizing effects obtainable.

In FIG. 5 there is fastened to plodder barrel 19 a nose section 99, to the end of which is held a perforated plate or extrusion section 101 containing opening or passages 103 therein, through which rods or filaments of the variegated soap are extruded into a plodder head compression zone 105 in an auxiliary variegating head 107. Rotating knife-pusher 109, connected to plodder worm 55 by rod 111, cuts off the rods or filaments of soap being extruded through passageways 103 and gives them a transverse or radial movement outwardly in compression zone 107, whereby a greater degree of marblizing or mottling is obtained. Additional means for imparting transverse or other motions to the soaps in the compression head 107 may be employed but are not illustrated. Then, the marblized soap billet is extruded through the opening 113 and past trimming knives 115, which shave off the outer surfaces thereto to expose better variegated regions of the soaps. The soap then may be conditioned, as by cooling or drying to facilitate pressing, and may be cut to length and pressed.

Figure 6:
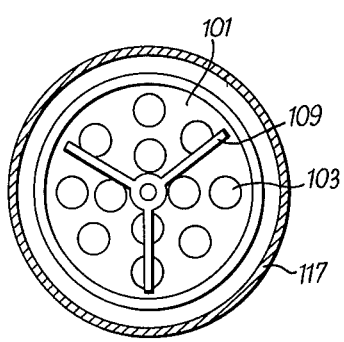
FIG. 6 is a transverse sectional view along plane 6—6 of FIG. 5, illustrating the openings in a plate through which mixed colored detergent passes and the rotating knife which cuts them and inparts transverse or radial movements to them.
Figure 7:
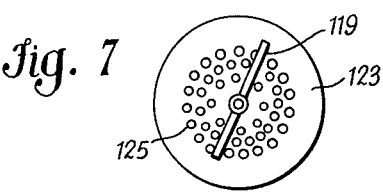
FIGS. 7 and 8 are views similar to that of FIG. 6, showing pressure plate and cutter-mixer designs.
Figure 8:
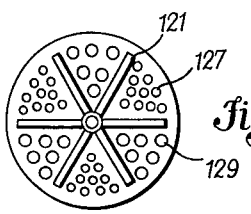

In FIG. 6 is shown the cutting knife 109 of FIG. 5, a three-bladed knife of relatively great longitudinal thickness (longitudinal with respect to the direction of the plodder barrel), "plate" 101, passageways, 103 and compression head wall 117. In FIGS. 7 and 8 are shown designs of other knives 119 and 121, the former with two blades and latter with six blades. In FIG. 7, pressure plate 123 includes perforations 125, all smaller in size than those illustrated in FIG. 6. Such openings give a more uniform and more gently marbled soap tablet than do the larger ones of FIG. 6. In FIG. 8, perforations 127 and 129 are of different sizes, leading to a variegating effect intermediate those of products made utilizing the plates of FIGS. 6 and 7. Instead of the comparatively regular distribution of the passageways of different sizes, they also may be interspersed, which will produce a somewhat different design.

Figure 9:
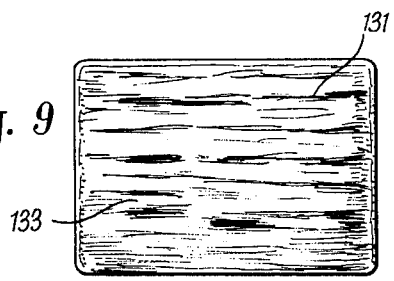
FIGS. 9, 10 and 11 are top plan; longitudinal, vertical sectional; and transverse, vertical, sectional views of variegated marblized soap tablets made according to the invention.
Figure 10:
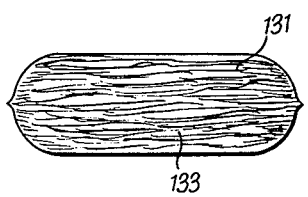
Figure 11:
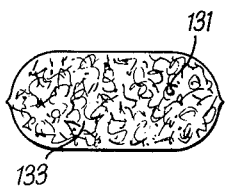

In FIGS. 9–11, there are shown views of a desirably variegated marblized bar made utilizing the apparatuses shown in FIGS. 1–3. Such equipment is employed because of the considered desirability of producing a marblized bar with a somewhat longitudinal or streaked appearance. Thus, colored soap 131 is rather evenly distributed in the light soap matrix 133. Because the coloring material used includes partially water soluble, water dispersible pigments, there is some penetration of the coloring material into the matrix soap, giving it a light colored appearance in places.

The synthetic detergents that find use, usually in blends with soaps but sometimes alone, are generally the solid anionic or nonionic detergents but amphoterics and cationics are sometimes present, generally in minor proportions. The synthetic anionic detergents are primarily alkali metal salts of higher alkyl or alkyl aryl sulfuric or sulfonic acids, wherein the alkyl is of 10 to 18 carbon atoms and the aryl is preferably benzene or benzene substituted with from 1 to 3 lower alkyl radicals. The higher alkyls are preferably from 12 to 16 carbon atoms long for the alkyl sulfonates and sulfates and the chains for the alkyl aryl sulfonates are preferably from 12 to 15 carbon atoms in length. The nonionic detergents used are those which are normally solid, such as the condensation products of ethylene oxide with the condensate of propylene oxide and propylene glycol, sold under the Pluronic trademark, especially Pluronic F-68.

Although the synthetic detergents may be major components of detergent bars, in most cases they will be minor proportions of the variegated bar products. Preferably, they will be blended with soap, which usually has better physical properties for processing, storage and use. In the manufacturo of some synthetic -soap combination bars, the soap employed will be a water-insoluble soap, e.g., magnesium stearate.

Preferred synthetic detergents that are employed are: sodium lauryl sulfate; linear dodecyl benzene sulfonate, sodium salt; sodium n-tetradecyl sulfonate; sodium n-hexadecyl sulfate; sodium n-hexadecyl benzene sulfonate; magnesium n-tetradecyl sulfate; potassium n-octadecyl sulfate; and sodium linear pentadecyl toluene sulfonate. Other useful synthetic detergents include sodium monoglyceride sulfates of coconut oil fatty acids; sodium salt of the lauryl alcohol-polyethylene glycol ether sulfuric acid ester; disodium di-alkyl sulfosuccinates; and other such compounds mentioned or referred to in the previously cited patent application.

Adjuvants may be present in the soap and synthetic detergent compositions used but will usually constitute only a minor proportion of the detergent composition. In the case of soap bars, adjuvant content, exclusive of water, byproducts of soap manufacture and unreacted raw materials, will usually be less than 10% of the total bar, preferably less than 5%. With the synthetic detergent bars this adjuvant content may be considerably higher, sometimes reaching 40%. Generally, most detergent bars, of soap or synthetic, will include at least about 1% of adjuvants, such as perfume, stabilizers, coloring agents, whitening agents, sequestrants, antioxidants, emollients, foaming agents, foam stabilizers, germicides, fungicides, plasticizers.

Water contents of milled soaps will usually be from 5 to 20% but can be as high as 25% in some cases. Floating soaps, not preferred products of the present processes, can be made with moisture contents as high as 30%. In the practice of the invention, it has been found desirable that the minor soap or synthetic detergent component of the variegated bars should have a lower firmness or a higher plasticity than the other soap or detergent during the variegating operations, to facilitate penetration of a coloring soap or detergent into the other detergent body. However, although the difference in plasticity is helpful and is often intentionally created by the addition of more water, glycerine, free fatty acid, oil, lotions or other plasticizing agents, including softer soaps and hydrotrope salts, the two bodies of detergent compositions should not have inordinately different plasticities. Thus, the plasticity of the minor component should usually be slightly less than that of the major component but enough less to promote filling in by the more plastic detergent of the openings between particles of the harder base, during the initial turns of the plodder worm after mixing of the differently colored detergent rods and filaments. Although the viscosity adjustment will be apparent to one operating the plodder and is largely empirical, a measure of the differences in viscosities involved can be realized by considering that the softer soap or synthetic composition will extrude through a narrow space, as between soap pressing dies and the surrounding die-box (clearance of 0.003 inch) ) at a pressure of about 150 p.s.i., whereas the harder soap or detergent may reguire about 200 p.s.i. to be extruded similarly.

For best binding of the different detergents, especially if they are milled hard soaps, the rods or filaments thereof are subjected to vacuum before being forced together in the plodding worm. Such operation removes any air present that might otherwise interfere with the binding of the surfaces together. This is best effected at a point where both base and coloring rods or filaments of soaps are being mixed together, usually in the primary plodder before plodding by the final worm thereof. At such point, especially if the soaps are in filament form and of small diameters, occluded air near the surfaces thereof may be withdrawn most readily. Furthermore, the gentle shearing, compressing and tensioning effected when the mixed soaps or detergents are fed by the worm into the lower barrel of the plodder aid in removing air or other entrapped non-condensible gases. For good gas removal the rods or filaments should be of a diameter or equivalent diameter of from 0.5 to 10 mm., preferably from 0.5 to 5 mm., and more preferably from 0.5 to 3 mm. With the thinner filaments, the lengths thereof are not important but with those which are thicker than 3 mm., it is preferred to have the rod lengths no greater than 20 mm. and preferably less than 10 mm.

To remove air from the detergent pieces most efficiently it will be desirable to employ the highest vacuum. However, even slight vacuums, such as those wherein the absolute pressure in the vacuum chamber is as high as 700 mm, of mercury, will be helpful. Usually there is employed a pressure of from 1 to 300 mm. Hg, absolute, preferably from 1 to 150 mm. Hg, abs. Of course, when equipment design permits, it will be preferred to employ similar vacuums in other earlier stages of the manufacturing process, for example, before the final plodding of the colored soap or in preliminary plodding and other operations on the base or colored soap.

The various mixing, conveying, milling and plodding equipment employed, except for that portion of the production equipment from the point at which the base and colored soaps are blended, to final extrusion and scraping, may be conventional equipment employed in soap manufacturing. Even in the critical portion of such manufacturing processes, insofar as producing a variegated soap is concerned, the equipment may be a readily modified form of the commercial apparatuses. The plodding worm employed and the drives therefor will be such as to minimize the churning of the soap particles but the working effect will be sufficient to blend them together and exert sufficient pressure to force the soap through the nozzle or a variegating attachment utilized. Generally, in the initial portion of the worm, that in communication with the vacuum chamber, the number of "threads" per unit length will be less than in the portion thereof enclosed in the barrel. Similarly, the depths of threads will be greater in the initial stages, thereby providing less compacting of the soaps. The speeds of revolution, usually from 2 to 30 r.p.m., will preferably be from 5 to 20 r.p.m., most preferably about 10 r.p.m.

To obtain the desired feed rates and mixings of the different detergent compositions, while at the same time removing air from these when a hard milled soap is being produced, the rate of feed to the plodder worm in the vacuum chamber should be regulated so that a substantial proportion of the worm is exposed. Automatic level detection means may be employed or visual means such as the window illustrated in FIG. 2, may be present, to allow operator control of feed rates to keep the worm sufficiently open. For good operation, the charge of soap is maintained below the top of the worm and preferably, the height of soap is, on the average, from 30 to 70% of the worm height, with a 50% height being considered most preferable for desired feed rates and maximum deaeration and blending.

The slightly greater plasticity of the colored or minor component of the variegated soaps aids in causing these to fill in the interstices between the harder base soap particles, thereby decreasing the amount of air entrapped in the soaps. Also, it tends to facilitate air removal from the more plastic minor soap component and from the surfaces of the base soap with which it comes into contact. Although the minor soap, generally comprising from 3 to 49% preferably from 3 to 25% and most preferably from 5 to 20% of the total detergent composition present, will often have a somewhat lower plasticity than the major soap, for the purposes indicated, it will usually have a similar moisture content and similar plodding properties, especially in mixture with the major soap. Thus, the difference in plasticity will not be so great as to cause preferential extrusion of the minor soap through the worm, extrusion plate openings and final nozzle plate, but there will be enough difference to promote deaeration, bonding and penetration. Such plasticity differences are detectable by the pressing technique previously described, or by a simple thumb pressing test. They may be caused by the addition to the miner soap component of from 9.5 to 10% of plasticizers, preferably from 1 to 5% thereof. Such plasticizers include the higher fatty acids, e.g., stearic acid, myristic acid; mineral oils and waxes, e.g., paraffin, petrolatum; animal and vegetable fats and oils; lower di- and polyhydric alcohols, e.g., glycerol, sorbitol, polyethylene glycol, Carbowaxer; hydrotrope salts, e.g., sodium cumene sulfonate, potassium benzene sulfonate, sodium xylene sulfonate; softer soaps, e.g., potassium oleate, potassium soaps of mixed tallow and coconut oil fatty acids; water; and other known plasticizers.

The plasticities of the detergent compositions being plodded are also dependent on temperature. Therefore, a plodder barrel will preferably be jacketed or otherwise capable of temperature regulation so as to maintain soap being processed at a desirable temperature. Such a temperature will usually be within a range of 30°C. to 60°C., preferably from 35°C. to 55°C and most preferably, from 38°C. to 45°C. Automatic temperature control is preferably employed on the water, oil or other fluid in the jackets. Although such temperature control may be limited to the final plodder or the final barrel thereof, it is preferred that when the different colored soaps or detergent compositions are mixed together they should be at about the same temperature. Therefore, temperature regulation of plodding and other processing conditions before the point of mixing are also desirable, with respect to both the base and the minor soap compositions.

At the end of the final worm the mixed soap is forced through a compacting section or an extrusion head, usually through a plodder nozzle and nozzle plate, which may be heated, extruded as a continuous bar, shaved, cut to length and pressed. Such a bar will be variegated, due to the mixing action in the vacuum chamber and the moving of the soaps through the plodder worm, but it will generally be longitudinally striped too, due to stream effects during the final extrusion. For additional control of the appearance of the bar, and for assistance in compacting the different soaps, a pressure plate may be installed at the end of the worm and before the plodding nozzle or head. Such a pressure plate may be one having openings therein in the ranges previously described for the plate through which soap is extruded from the top worm of the primary plodder. Preferably, the holes will be of an equivalent diameter to from 0.5 to 5 mm. To further modify the variegating effects, a cutting knife is used, which is preferably thick enough so that as it rotates it imparts a transverse or whirling motion to the soap filaments or rods being extruded through the openings in the pressure plate. This spreads them better through the area of the compression head and leads to a more distinctive mottling or marbling effect. The thickness of the knife blades will usually be from 0.3 to 4, preferably 0.4 to 2 cm., so as to impart a significant degree of transverse movement to the extruded material being cut off and moved transversely by the blades. Generally the cutting knife will have from one to twelve blades, preferably from two to five blades. The number of blades may be dependent on the number of openings in the pressure plate and the sizes thereof, to obtain desired degrees of variegating effects. Sometimes plural blade units will be employed in the compacting head so that at separate parts thereof transverse motions will be given to the variegated soap. Thus, when sharply contrasting variegating effect are desired, one might employ fewer blades and a larger pressure plate opening with the number of openings being small. Generally, the number of openings will be from about 3 to 100, with from 3 to 40 being used for more prominent variegating effects and from 50 to 100 for a "gentler" marblizing.

The nature of the marblizing effects is also controlled by the type of coloring material employed. This usually constitutes a very small proportion, generally less than 1% and often less than 0.1 or 0.01% and may even be as low as 0.001% of the content of the colored soap.

Thus, it does not affect the physical properties of the soap, other than their appearances. If the coloring material is one of the well known insoluble pigments, such as the water dispersible pigments which are commercially available and marketed for the coloring of soaps, less bleading into the base soap is noted and a more contrasting variegating effect is the result. On the other hand, if dyes are used, it will often be difficult to prevent them from penetrating into the base soap. Of course, some desirable combinations of the water dispersible pigments and the water soluble dyes may be used and in some cases, small proportions of oil soluble dyes or oil dispersible pigments may be included for their additional effects.

The perforated pressure plate and the cutting knife blades may be located adjacent to the end of the worm or at the end of a compacting section which follows the worm. In the latter case, there will be another plodding head or compression section before extrusion of the final bar. This is necessitated because the pieces of soap must be fused again into a compact form to create a unitary variegated bar. In either case, the final compacting head or plodder nozzle section is preferably one of comparative shortness, with respect to its width and will normally be less than half as long, as the diameter of the lower plodder worm. By using short flow path nozzles, the degree of streaking or striping of the product is diminished, compared to use of an ordinary comparatively long conical plodder head. Of course, where streaking is desirable, the use of the knife and shortened plodder head may be omitted.

The operation of the present apparatus and the practice of the invented processes are considered to be clear from the preceding description and drawings. The type of variegating effect obtained will be found to be comparatively easily controlled by an operator and the changes in operating techniques and apparatuses employed to produce certain effects will become obvious to him after employment of the present machinery over a period of time. The advantages accruing from its use are many. Principally, variegated detergent bars of consistantly similar, although not identical designs, can be manufactured with little change in regular production lines and without the necessity for the purchase of expensive auxiliary equipment. The designs can be varied by minor changes, such as the proportion of plasticizer added to the colored soap, screen sized, hole density therein, knife blade construction, plodding speeds, etc. It is true that to convert from a variegated soap line to a white soap line, cleaning out of the lower worm of the main plodder is required. However, the cleaning may be made easier by the fact most of the soap in that lower worm will be white soap and colored particles will stand out more readily on the white background, thereby making their removal easier. By the present manufacturing techniques, it is not necessary to employ special means for controlling the conditions at which the colored and uncolored soaps are fused together, since they pursue intimate and parallel paths through the plodder wall, at which time their temperatures become identical and fusion is facilitated.

The following examples illustrate some embodiments of this invention. Unless otherwise indicated, all parts are by weight and all temperatures are in °C.

EXAMPLE 1

A white soap is prepared by drying and converting to ribbon form a mixture of 95.7 parts of a 33% moisture kettle soap, made from a charge of 62% tallow and 38% coconut oil, 4% distilled palm oil fatty acid and 0.3% of a mixture of preservative, sequestrant and antioxidant. The moisture loss is 21.9% and 73.1 parts of soap products are produced, of 10.6% moisture. Subsequently this soap is whitened further by milling together 96.8 parts thereof, 0.25 part titanium dioxide, 1 part soap perfume and 2 parts water, to produce a white soap base. A colored soap is produced from the "unwhitened soap" by milling together, with 96.5 parts thereof, 1 part soap perfume, 2 parts glycerine, 0.5 part water and 0.03 part of a water dispersible green pigment, Viscofil Green, powder (Sandoz).

Five parts of the colored soap are mixed with 95 parts of the white base soap in the vacuum head of a twin barrel plodder, the equipment used being like that illustrated in FIGS. 1 and 2. The plodding head used is like that of FIG. 4 and the soap produced resembles that of FIGS. 9–11.

The temperature of the soaps plodded into the vacuum zone is about 42°C. The temperature of the water in the jacket about the lower primary plodder worm is 35°C. and it counteracts the heating of working, to maintain the soap temperature at about 42°C., at which temperature it is extruded. The sizes of the soap rods, when blended in the vacuum chamber, approximate 2 cm. in length and are cylindrical, of diameters of about 8 mm. The cutting knife used is a three-bladed knife with a thickness of about 2 mm. and a sharp cutting edge. The throughput of soap is at the rate of about 30 pounds per minute, total. The main plodder worm revolves at about 8 r.p.m. and the pressure in the compacting extrusion nozzle zone is about 200 lbs./sq. in. Control of the variegated design is maintained by holding the feed rates of the soaps so that the plodder worm is just half covered with soap rods and the rates are proportionately and regularly maintained to keep this condition constant, controls being by regulations of worm speeds of the plodders.

Bars like these of FIGS. 7–9 are made by shaving off the outer 1/16 inch of the surfaces of the extruded bars, then surface drying and cooling them and pressing in an ordinary soap press. When the shaving operation is omitted, the appearance of the bar is less attractive and more striped.

A more highly marblized product is obtained when, in place of the head of FIG. 4, that shown in FIG. 5 is used. In such case, a three-bladed knife with a thickness of approximately 1 cm. is used and the auxiliary compacting head following the knife is about ¼ as long as the worm diameter. The extrusion plate used includes 30 holes, each of which is about 9 mm. in diameter. Otherwise, the conditions are essentially the same as those previously described.

Variations in the mottling or marblizing effects are obtained by altering the number of knives used from three to six or ten, and the marblizing is not as pronounced. When, instead, the nozzle of FIG. 5 is replaced with that of FIG. 3, a more highly striped product results.

EXAMPLE 2

A wide variety of soaps of mixed colors is produced by utilizing the processes, apparatuses and formulations of Example 1 substituting other coloring materials for the described water dispersible pigment. For example, pigments and dyes such as Blue Iragon L/UD (Geigy); 1390 Pink GT Vat Red No. 1 (D. F. Anstead, Ltd.); C. I. Pigment Green 7 (Geigy, Sandoz); and C. I. Pigment Red 6 (Geigy) are employed. Soap- or water-soluble dyes are also used to obtain a more diffused, variegated product and in some cases, a mixture of the pigments and dyes is employed. In these formulas, the soap composition is varied to 85% tallow soap and 15% coconut oil soap, with no addition of fatty acids. The moisture content of the soap is 14% and the proportions of colored and uncolored or differently colored soaps are varied over the range from 50:50 to 5:95, preferably 25:75 to 5:95. The products obtained are all variegated, marblized soaps of attractive appearances. The colored shavings are recycled back with the colored soap, to avoid waste. No difference in appearance of the final soap product is noted.

EXAMPLE 3

The procedures of Examples 1 and 2 are repeated but with the base soap also being colored, although of a lighter and contrasting color with that of the "colored" soap from the secondary plodder. Coloring of the major soap is effected with water-soluble and soap-soluble dyes, which are added to the kettle soap before removal of the moisture therefrom, so that the colors are uniformly distributed, preferably yielding pastel shades. The products made are attractive marblized soaps in which the contrasts are more subdued than in the products made by following the methods of Examples 1 and 2.

The products of Examples 1, 2 and 3 are tested in practical washing tests and are found to be satisfactorily bonded together. They do not wash away unevenly, are not rough or pebbly after use, and do not crack excessively. Incorporation of plasticizing agent and the maintenance of the moisture content within the desired range of 8 to 15% are considered to help in maintaining the desirable use properties of the final tablet.

EXAMPLE 4

The experiments of Examples 1–3 are repeated with 30% of the soap being replaced by sodium lauryl sulfate or with 70% of the soap being replaced by a mixture of magnesium stearate and linear higher alkyl benzene sulfonate, sodium salt, in which the higher alkyl is substantially of 12 to 15 carbon atoms, averaging about 13 carbon atoms. Such synthetic detergent-soap combination bars are marblized and have the desirable cohesiveness and washing properties previously mentioned.

The invention has been described with respect to various embodiments thereof but it will be appreciated that it is not limited to those, since it will be obvious to one of skill in the art to substitute equivalents for various elements of the invented processes and apparatuses.

What is claimed is:
1. Apparatus for manufacturing a variegated detergent bar which comprises:
 a. first detergent plodding means,
 b. second detergent plodding means,
 c. a vacuum chamber communicating with said first and second plodding means,
 d. a final third plodding means located below and communicating with said vacuum chamber,
 e. said final plodding means including a mixing worm having a predetermined diameter
 f. means for regulating the rate of feed to said final plodding means to leave from 30 to 70 percent of said worm immediately below said vacuum chamber uncovered during operation,
 g. extrusion means including a pressure plate with a plurality of holes located at the downstream end of said final third plodder means.
 h. rotating and cutting means disposed downstream from said extrusion means for imparting a transverse or radial motion to detergent passing through said pressure plate and cutting extruded detergent to desired length,
 i. compression means disposed downstream from said rotating and cutting means,
 j. said compression means including a chamber having a length less than one half of said predetermined diameter of said worm and,
 k. final extrusion means disposed downstream from said compression means for forming said detergent into bar shape.

* * * * *